(12) United States Patent
Cowlishaw

(10) Patent No.: US 8,387,655 B2
(45) Date of Patent: Mar. 5, 2013

(54) SLURRY FLOW CONTROL DEVICE

(76) Inventor: Kelly Cowlishaw, Wenatchee, WA (US)

( * ) Notice: Subject to any disclaimer, the term of this patent is extended or adjusted under 35 U.S.C. 154(b) by 453 days.

(21) Appl. No.: 12/797,875

(22) Filed: Jun. 10, 2010

(65) Prior Publication Data

US 2010/0313967 A1 Dec. 16, 2010

Related U.S. Application Data

(60) Provisional application No. 61/186,750, filed on Jun. 12, 2009.

(51) Int. Cl.
*F16K 15/00* (2006.01)
*F16K 17/00* (2006.01)
*F16K 21/04* (2006.01)
*F16K 15/14* (2006.01)
*F16K 7/04* (2006.01)

(52) U.S. Cl. ............ 137/512; 137/535; 137/847; 251/4; 251/6

(58) Field of Classification Search .................. 137/511, 137/512, 535, 847; 251/4, 5, 6, 7
See application file for complete search history.

(56) References Cited

U.S. PATENT DOCUMENTS

| | | | | |
|---|---|---|---|---|
| 2,699,124 | A | * | 1/1955 | Moe ............................. 417/572 |
| 3,511,468 | A | * | 5/1970 | Young .............................. 251/6 |
| 4,164,223 | A | * | 8/1979 | Munib .......................... 606/209 |
| 5,326,033 | A | * | 7/1994 | Anfindsen ....................... 239/61 |
| 5,881,916 | A | * | 3/1999 | Madjarac ...................... 222/102 |
| 2010/0294378 | A1 | * | 11/2010 | Kleimann, Sr. ............ 137/15.04 |

* cited by examiner

*Primary Examiner* — John K Fristoe, Jr.
*Assistant Examiner* — Frederick D Soski
(74) *Attorney, Agent, or Firm* — Lowe Graham Jones PLLC

(57) ABSTRACT

A system for controlling slurry flow through a flexible-walled transport tube. An example system includes a frame, a pivot pin, a rotatable radial arm having an attached pressure pad, a spring tension adjustment rod extending between the radial arm and the frame, and a coil spring concentric with the spring tension adjustment rod and configured to oppose rotation of the radial arm away from a flexible-walled transport tube contacting the pressure pad. In one operating condition, a decrease in the pressure of the slurry within the transport tube reduces the force applied by the slurry outward on the tube wall, leading the spring to rotate the radial arm toward the tube, causing the contact pad to deflect the wall of the flexible-walled transport tube and impeding the flow of slurry through the tube.

14 Claims, 4 Drawing Sheets

SLURRY FLOW CONTROL DEVICE

PRIORITY CLAIM

This application claims priority from provisional U.S. Patent Application No. 61/186,750, filed Jun. 12, 2009, the contents of which are hereby incorporated by reference.

BACKGROUND OF THE INVENTION

In the delivery of concrete slurries though a pipe or tube, there is typically a requirement to control the flow. In cases where flow is driven by applied pressure at the source, for example by pumping, slurry may continue to flow out of the pipe or tube even after pressure is removed, due to gravity, inertia, or sustained pressure in the hose. In the case where pressure was removed in order to halt the flow, this creates the undesirable condition where slurry flow continues for a short time even after the flow is desired to be stopped.

SUMMARY OF THE INVENTION

The present invention includes a system for controlling slurry flow through a transport tube. An example system includes a frame, a pivot pin, and at least a pair of opposing radial arms. The arms rotate about the pivot pins and each has a pressure pad attached at an end opposite the pivot pin. A spring tension adjustment rod extends between the radial arm and the frame. A coil spring is mounted on the adjustment rod for applying pressure to a flexible-walled transport tube that is in contact with the pressure pad.

When pressure is applied to a slurry in the transport tube, pressure from the slurry is exerted outward on walls of the transport tube. The outwardly exerted pressure forces the arms into an open position, thus allowing the slurry to flow through the tube. When the pressure is removed from the slurry, the arms are forced by the springs to a closed position, thus stopping the flow of slurry through the tube.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
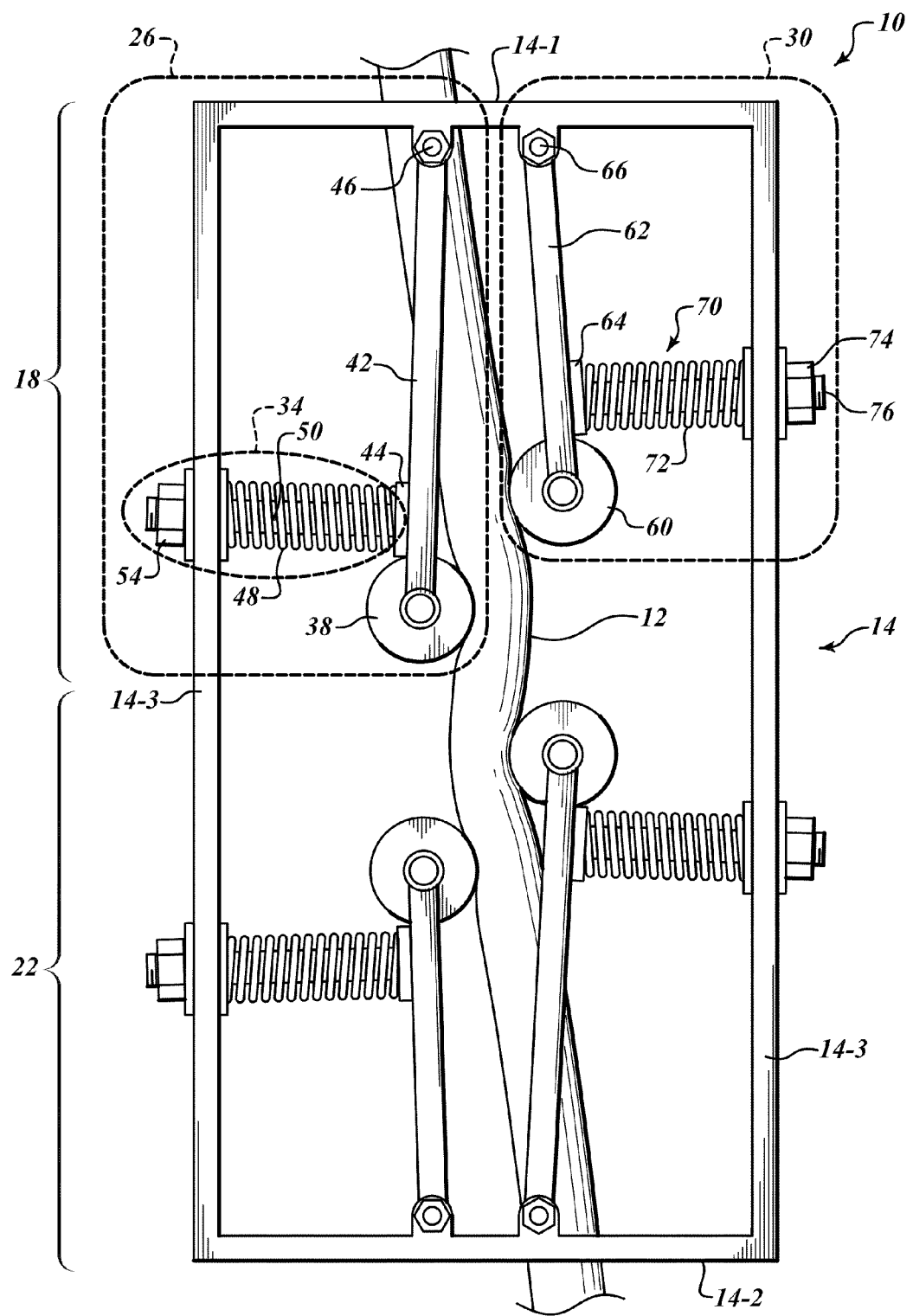
FIGS. 1 and 2 illustrate front plan views of an example system formed in accordance with an embodiment of the present invention.
Figure 2:
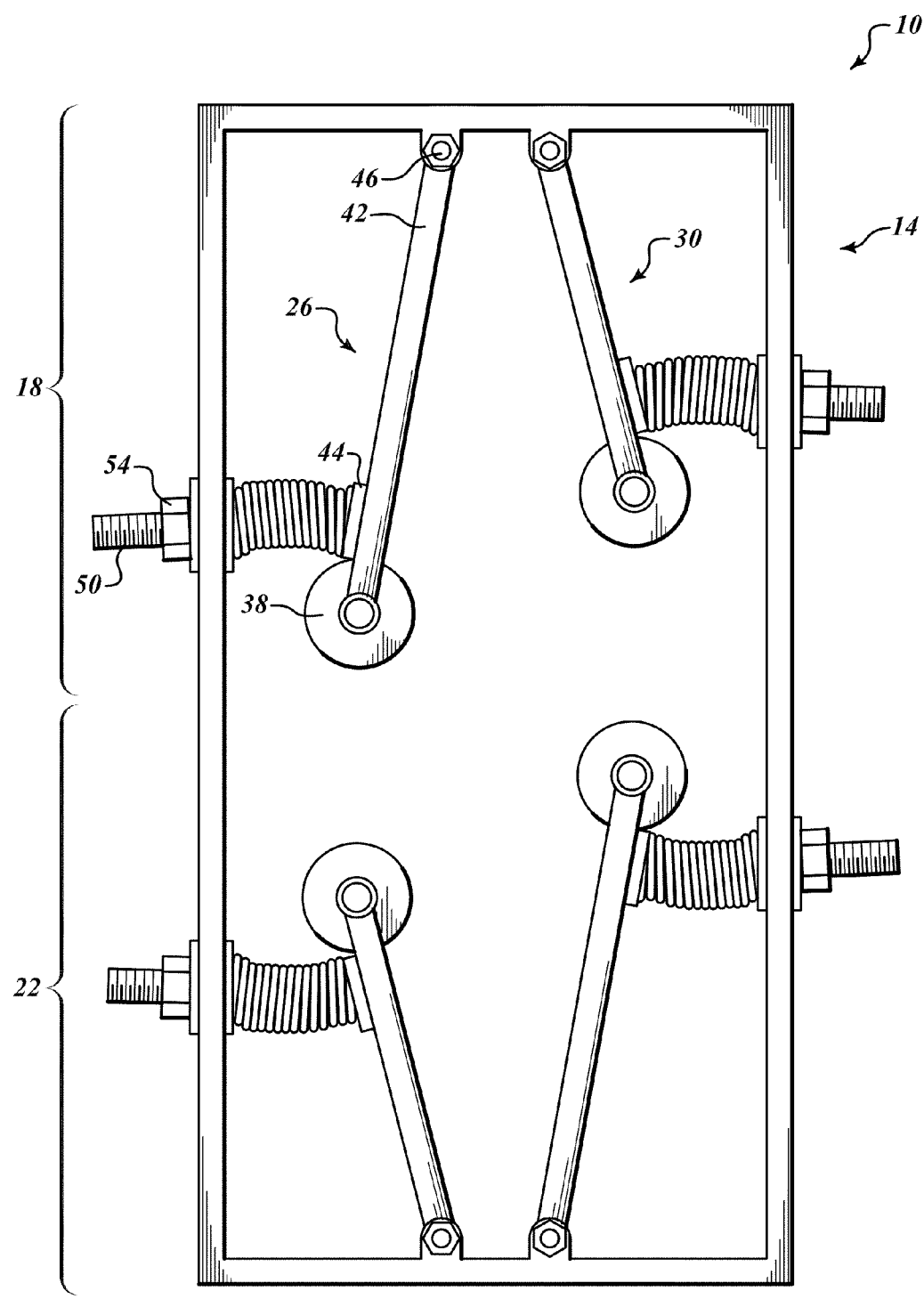
Figure 3:
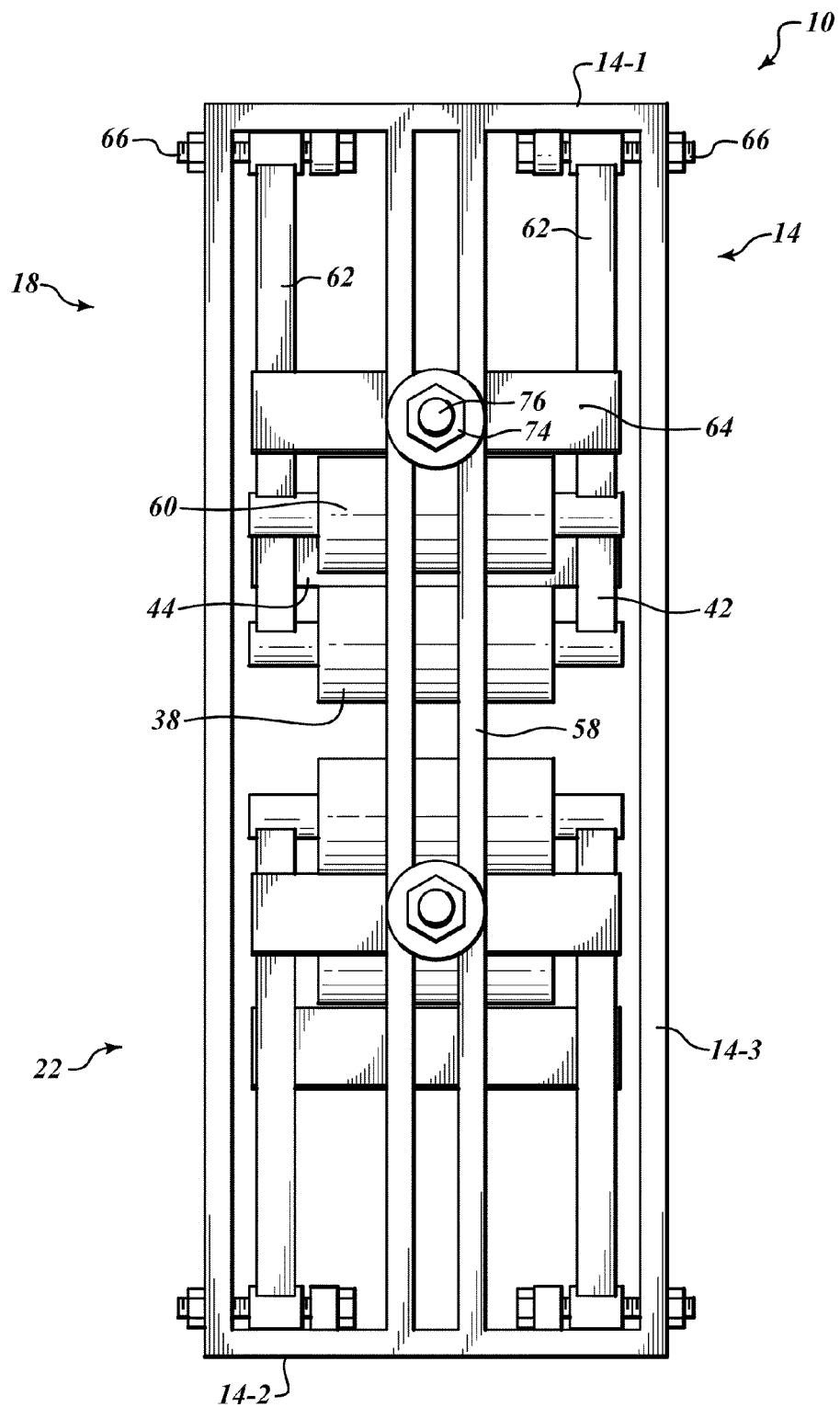
FIG. 3 illustrates a side plan view of the example system shown in FIGS. 1 and 2.

FIGS. 1-3 illustrate an embodiment of an example slurry flow control device 10 designed to control flow of an applied slurry (such as concrete) through a flexible-walled transport tube 12. The slurry control device 10 includes a frame 14, a first flow restrictor 18 and a second flow restrictor 22. Each flow restrictor includes first and second swing arm components 26, 30, respectively.

In one embodiment, the frame 14 is an elongated box-like structure that includes top segments 14-1, bottom segments 14-2 and four vertical segments 14-3. The four vertical segments 14-3 connect the top segments 14-1 to the bottom segments 14-2. The first flow restrictor 18 is located in an upper half of the frame 14 and the second flow restrictor 22 is located in a lower half of the frame 14. The flexible-walled transport tube 12 passes through each of the first and second flow restrictors 18, 22, and through the top and bottom frame segments 14-1, 14-2.

The swing arm component 26 includes a pressure pad 38, a radial arm 42, a radial arm bracket 44, a pair of pivot pins 46, and a tension application component 34. The swing arm component 30 includes a pressure pad 60, a radial arm 62, a radial arm bracket 64, a pair of pivot pins 66, and a tension application component 70. As shown in FIG. 3, the radial arms 42 and 62 are substantially rigid U-shaped structures, where each end of the arms rotates about a respective pair of pivot pins 46, 66. The pair of pivot pins 46, 66 is affixed to the top frame segment 14-1 and both pins of a pair lie along a common longitudinal axis. The bottoms of the radial arms 42, 62 (opposite end from the pivot pins 46, 66) provide a mounting position for the respective pressure pads 38, 60. The radial arm bracket 44 spans from one branch of the radial arm 42 to the other and provides a mounting point for the tension application component 34. The radial arm bracket 64 spans from one branch of the radial arm 62 to the other and provides a mounting point for the corresponding tension application component 70.

The pressure pads 38, 60 are barrel-shaped structures, substantially rigid, that are attached to a base section of the respective arms 42, 52. The pressure pads 38, 60 are oriented so that a portion of the rounded surface of the pressure pads 38, 60 face and come in contact with the flexible-walled transport tube 12.

As shown in FIG. 1, each of the tension application components 34, 70 includes a spring 48, 72, a spring tension adjustment rod 50, 76, and a spring tension adjustment nut 54, 74. The spring tension adjustment rods 50, 76 are rigid, at least partially threaded rods fixed at one end to the radial arm brackets 44, 64 and adjustably secured at the other end to vertical adjustment rails 58. The vertical adjustment rails 58 extend between the top and bottom segments 14-1, 14-2 of the frame 14. As shown in FIG. 3, the spring tension adjustment rods 50, 76 are held in tension by the compression of the springs 48, 72, which pull the spring tension adjustment nuts 54, 74 against the outside of the vertical adjustment rails 58.

Both the position and the resistance to movement of the radial arms 42, 62 are regulated by the springs 48, 72. Longer springs position the radial arms 42, 62, closer to one another, thus making the flow control device 10 more suitable for a narrower transport tube 12. Shorter springs make the flow control device 10 more suitable for a wider transport tube 12. A stiffer spring 48, 72 makes the radial arm 42, 62 more resistant to movement, thereby making the device 10 suitable for more viscous slurries. A softer spring 48, 72 makes the radial arm 42, 62 less resistant to movement, thereby making the device 10 suitable for less viscous slurries. The tension of a given spring 48, 72 can be adjusted by tightening or loosening the spring tension adjustment nut 54, 74, making the spring 48, 72 softer or stiffer.

The first and second swing arm components 26, 30 are positioned on opposing sides of an axis bisecting the frame 14 from top to bottom. The radial arms 42, 62 are positioned within the frame 14 to swing substantially parallel to one another in intersecting arcs. As shown in FIG. 1, in one embodiment the radial arms 42, 62 differ in length, leading the flexible-walled transport tube 12 to be bent over between the pressure pads 38, 60.

The slurry flow control device 10 operates to regulate slurry flow through the accompanying flexible-walled transport tube 12. As shown in FIG. 1, the flexible-walled transport tube 12 passes through the top segment 14-1 and the bottom segment 14-2 of the frame 14. As the flexible-walled transport tube 12 passes through the frame 14, the tube 12 passes between the pressure pads 38, 60 of the first and second flow restrictors 18, 22. The length of each spring 48, 72 is selected so that each pressure pad 38, 60 is positioned a distance apart from one another such that each pressure pad 38, 60 contacts the outside wall of the flexible-walled transport tube 12. When pressure within the tube 12 is high (above a threshold), as under a pumping condition, the swing arm components 26, 30 retract under the force of the slurry pressure exerted outward on the wall of the tube 12, allowing slurry to exit the tube 12. When pressure within the tube 12 is low (below a threshold), as under a non-pumping condition, the swing arm components 26, 30 rotate back toward the tube 12, closing off the interior of the tube 12 and preventing slurry from exiting the tube 12.

As shown in FIG. 3, the vertical adjustment rail 58 includes a pair of rigid vertical supports extending from the top segment 14-1 to the bottom segment 14-2. The supports form a slot to accept the spring tension adjustment rod 50. The extent to which the swing arm components 26, 30 can rotate back toward the tube 12 is limited by the spring tension adjustment nuts 54, 74, which become pulled against the outside of the vertical adjustment rails 58. The slot allows the spring tension adjustment rod 50, 76 to be moved up or down relative to the radial arm 42, 62. This adjustment is useful for keeping the spring 48 approximately tangent with the arc traced by the radial arm 42, 62. The spring tension adjustment nut 54 is threaded onto the adjustment rod 50. Tightening of the spring tension adjustment nut 54, 74 draws the adjustment rod 50 through the slot, shortening the length of the adjustment rod 50, 76 between the radial arm 42, 62 and the vertical adjustment rail 58.

As illustrated in FIGS. 1-3, the example slurry flow control device 10 includes a first and second flow restrictor 18, 22. In this embodiment, the second flow restrictor 22 is constructed and operates substantially the same as the first flow restrictor 18. The two flow restrictors 18, 22 work cooperatively, in series along the transport tube 12, to control the flow of slurry through the transport tube 12.

Figure 4A:
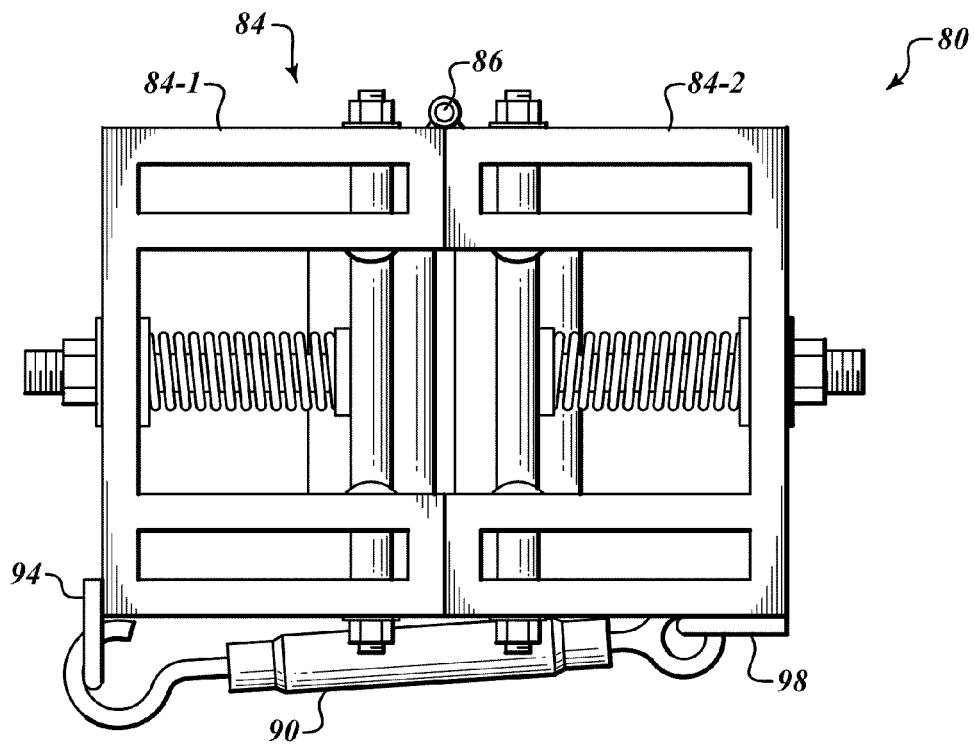
FIGS. 4A and 4B illustrate top plan views of an example system formed in accordance with a second embodiment of the present invention.
Figure 4B:
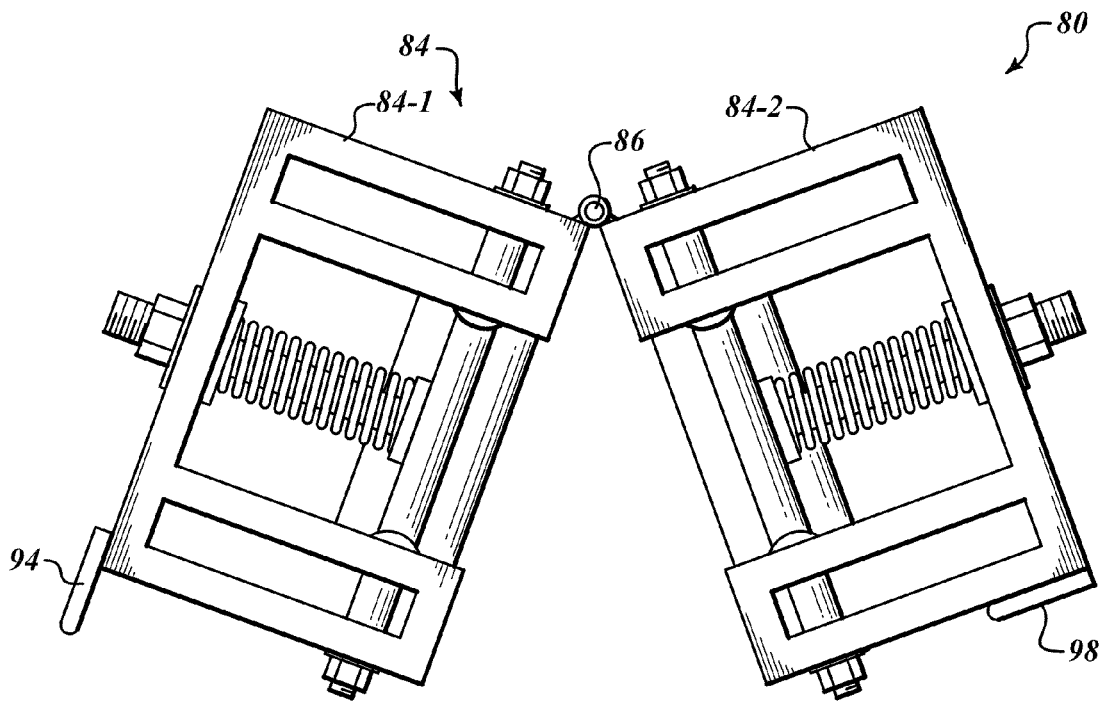

FIGS. 4A and 4B show an alternative embodiment of the fluid flow control device 80. The device 80 includes a frame 84, a left-hand frame 84-1 and a right-hand frame 84-2. The frames 84-1, 84-2 are essentially two halves of the frame 84 split in half between the swing arm components 26, 30. The frames 84-1, 84-2 are mechanically connected to one another by at least one hinge 86 and at least one clasp device 90. A loop feature 94 is attached to the left-hand frame 84-1. A hook feature 98 is attached to the right-hand frame 84-2. The clasp device 90 is adjustable in length. The clasp device 90 includes a loop on one end and a hook on the other end. When the device 80 is in closed position, the loop of the clasp device 90 is received by the hook feature 98 and the hook of the clasp device 90 is received by the loop feature 94, thus clamping the two frames 84-1, 84-2 together. FIG. 4B shows the device 80 in an open position. In the open position the clasp device 90 is removed, thus allowing the two frames 84-1, 84-2 to rotate about the hinge 86. When the device 80 is in the open position, the transport tube 12 is easily loaded into the fluid flow control device 80 without requiring a free end of the transport tube 12 to be fed through the frame.

While the preferred embodiment of the invention has been illustrated and described, as noted above, many changes can be made without departing from the spirit and scope of the invention. For example, the device may include radial arms that are L-shaped or some other shape provided a pad can apply the proper pressure to the received tube. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A device comprising:
    a frame configured to receive a flexible tube;
    a first pressure device coupled to the frame on a first side of the received flexible tube; and
    a second pressure device coupled to the frame on a second side of the received flexible tube,
    wherein the first pressure device applies a first amount of pressure to a first location on the flexible tube and the second pressure device applies a second amount of pressure to a second location on the flexible tube, when the device is in a flow mode,
    wherein the first pressure device applies a third amount of pressure to the first location on the flexible tube and the second pressure device applies a fourth amount of pressure to the second location on the flexible tube, when the device is in a non-flow mode,
    wherein the first and second pressure devices are rotatably coupled to first points on the frame,
    wherein the first and second pressure devices are coupled at second points on the frame,
    wherein each of the first and second pressure devices comprises a first arm, a pressure pad and a second arm,
    wherein the first arm is connected to the respective first point at a first end of the first arm and the pressure pad is mounted to the first arm at a second end of the first arm,
    wherein the second arm is mounted to the first arm at a first end of the second arm and is adjustably attached to the respective second point on the frame at a second end of the second arm.

2. The device of claim 1, wherein the second points are adjustable.

3. The device of claim 1, wherein each of the first and second pressure devices further comprises a spring mounted on the second arm and is mechanically coupled to the first arm and the frame.

4. The device of claim 1, wherein each of the first arms is rotably connected to the frame at two first points.

5. The device of claim 1, wherein the pressure pads are cylinder-shaped and oriented so that when contacting the flexible tube, the flexible tube bends over a round face of the pressure pad.

6. The device of claim 5, wherein the first arms of the first and second pressure devices have different lengths, wherein the pressure pads are offset from one another along a longitudinal axis of the flexible tube when in contact with the tube.

7. The device of claim 6, wherein the first and second pressure devices are mounted at a first side of the frame, the device further comprising a second set of pressure devices mounted at a second side of the frame.

8. A device comprising:
    a frame;
    at least one pivot pin secured to the frame;
    a radial arm having a first end and a second end, wherein the first end is rotatable about the pivot pin;
    a pressure pad fixed to the second end of the radial arm;
    a spring tension adjustment rod having a first end and a second end, wherein the first end is fixed to the radial arm at a point distant from the radial arm first end, wherein the second end is fixed to the frame, and wherein the rod is aligned substantially parallel to the plane of rotation of the radial arm and substantially perpendicular to the radial arm; and a coil spring substantially concentric with the spring tension adjustment rod and configured to oppose rotation of the radial arm away from a flexible-walled transport tube contacting the pressure pad.

9. The device of claim 8, wherein the radial arm first end comprises two branches and each branch is rotatable about a separate one of the at least one pivot pin.

10. The device of claim 8, wherein the pressure pad is cylinder-shaped and oriented with a longitudinal axis of the pressure pad aligned substantially perpendicular to a longitudinal axis of the transport tube.

11. The of claim 8, further comprising a spring tension adjustment nut, wherein the spring tension adjustment rod is threaded to accept the spring tension adjustment nut, and wherein the rod and nut combine to make the distance between the first and second ends of the adjustment rod adjustable by turning the adjustment nut.

12. The device of claim 8, wherein there are two of each element, except the frame, wherein each element is positioned substantially symmetrically about a vertical center axis of the frame, and wherein the two radial arms rotate in substantially the same plane as one another.

13. The device of claim 12, wherein the two radial arms have different lengths.

14. The device of claim 12, further comprising a second slurry flow control device positioned along the vertical center axis of the frame in series with the first slurry flow control device.

* * * * *